(12) United States Patent
Ali et al.

(10) Patent No.: US 7,902,124 B2
(45) Date of Patent: Mar. 8, 2011

(54) SELF-DIVERTING ACID TREATMENT WITH FORMIC-ACID-FREE CORROSION INHIBITOR

(75) Inventors: Syed Ali, Sugar Land, TX (US); Javier Sanchez Reyes, Katy, TX (US); Mathew M. Samuel, Sugar Land, TX (US); Francois M. Auzerais, Boston, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/545,381

(22) Filed: Aug. 21, 2009

(65) Prior Publication Data

US 2010/0056405 A1    Mar. 4, 2010

Related U.S. Application Data

(60) Provisional application No. 61/092,928, filed on Aug. 29, 2008.

(51) Int. Cl.
*C09K 8/52* (2006.01)
*E21B 37/06* (2006.01)

(52) U.S. Cl. ........ 507/90; 166/304; 166/305.1; 166/307; 166/308.1; 166/308.2; 166/311; 166/312; 507/268; 507/269; 507/277; 507/922; 507/923; 507/927

(58) Field of Classification Search .......... 507/268, 507/90, 269, 277, 922, 923, 927; 166/304, 166/305.1, 307, 308.1, 308.2, 311, 312
See application file for complete search history.

(56) References Cited

U.S. PATENT DOCUMENTS

| | | | |
|---|---|---|---|
| 3,077,454 | A | 2/1963 | Monroe et al. |
| 4,734,259 | A | 3/1988 | Frenier et al. |
| 5,013,483 | A | 5/1991 | Frenier et al. |
| 5,096,618 | A | 3/1992 | Frenier |
| 5,543,388 | A | 8/1996 | Williams et al. |
| 6,399,546 | B1 | 6/2002 | Chang et al. |
| 7,237,608 | B2 | 7/2007 | Fu et al. |
| 7,288,505 | B2 | 10/2007 | Change et al. |
| 7,341,107 | B2 | 3/2008 | Fu et al. |
| 2006/0041028 | A1* | 2/2006 | Crews .......... 516/135 |
| 2006/0081370 | A1* | 4/2006 | Fu et al. ......... 166/279 |
| 2008/0139414 | A1 | 6/2008 | Cassidy et al. |

FOREIGN PATENT DOCUMENTS

| | | |
|---|---|---|
| EP | 0276879 | 8/1988 |
| EP | 0638663 | 6/1994 |
| WO | 2005121273 | 12/2005 |

OTHER PUBLICATIONS

SPE106185—Cassidy, J.M., McNeil, R.I., Kiser, C.E.—Understanding Formic Acid Decomposition as a Corrosion Inhibitor Intensifier in Strong Acid Environments. Feb. 28-Mar. 2, 2007, Society of Petroleum Engineers.
Evaluation of the Inhibitor Effect of L-ascorbic Acid on the Corrosion of Mild Steel—Ferreira, E.S., Giaocomelli, C., Spinelli, A.—Materials Chemistry and Physics 83 (2004) 129-134. Published by Elsevier B.V.

* cited by examiner

*Primary Examiner* — Timothy J. Kugel
(74) *Attorney, Agent, or Firm* — Martin Rzaniak; David Cate; Robin Nava

(57) ABSTRACT

A method of treating a subterranean formation penetrated by a wellbore of a well having iron-containing components is carried out by introducing a treatment fluid into the wellbore of the well. The treatment fluid is formed from an aqueous solution, a mineral acid, a viscoelastic surfactant gelling agent and corrosion inhibitor system containing at least one of an alkyl, alkenyl, alicyclic or aromatic substituted aliphatic ketone and aliphatic or aromatic aldehyde. The treatment fluid is substantially free of any formic acid or precursor formic acid. In certain embodiments, the corrosion inhibitor system comprises a mixture of at least one of an alkenyl phenone or α,β-unsaturated aldehyde, an unsaturated ketone or unsaturated aldehyde other than the alkenyl phenone and α,β-unsaturated aldehyde, a dispersing agent, an extender and an alcohol solvent. A corrosion inhibitor intensifier may also be used in certain embodiments, which may include a mixture of cuprous iodide and cuprous chloride.

19 Claims, 1 Drawing Sheet ll
SELF-DIVERTING ACID TREATMENT WITH FORMIC-ACID-FREE CORROSION INHIBITOR

CROSS-REFERENCE TO RELATED APPLICATIONS

This application claims the benefit of U.S. Provisional Application No. 61/092,928, filed Aug. 29, 2008, which is incorporated herein by reference in its entirety.

BACKGROUND

In oil and gas wells, when carbonate reservoir rocks are acidized with hydrochloric acid, a few dominating channels or wormholes may be created, with a majority of the acid flow along these channels, leaving the rest of the reservoir rock unstimulated. This selective stimulation is undesirable, particularly when long vertical or horizontal sections are to be treated. To overcome these shortcomings, methods of diverting the treating fluid were developed to divert the flow of acid from areas of high permeability, to ensure the treatment of the entire section. Over the years, many chemicals including polymer gels, foam, oil-soluble resins and rock salt have been used as diverting agents. Field application of these diverting agents requires pumping of multiple stages of alternating acid and diverting agent.

More recently, self-diverting acids have been employed to simplify the process and to eliminate the need for multiple stages of alternating acid and diverting agent. The self-diverting acids employ the use of viscoelastic surfactants (VES). The viscoelastic surfactants are designed to gel at intermediate pH levels. When the acid treating fluid is initially at a low pH, the VES has a very low viscosity, making the VES acid treating fluid easy to pump and flow into the pores and channels of the formation. As the acid begins to react, the fluid undergoes an increase in viscosity due to the increases in calcium ions and pH, thus causing in-situ gelling of the acid. The higher viscosity of the gelled VES temporarily blocks the wormholes and channels formed in the formation, allowing the acid to divert to other untreated areas. The viscosity of the gelled acid can be completely reduced by the introduction of a mutual solvent or by produced hydrocarbon during flowback.

In any of these acid treatments, the acids used come in contact with metals while pumping and during flowing back, which can damage the metal components and equipment used. As a result, the presence of suitable acid corrosion inhibitors are required for the acidizing treatments. Acid corrosion inhibitors (ACI) used for oilfield applications normally contain formic acid components or formic-acid-producing compounds when exposed to well conditions. Although these corrosion inhibitors have been successfully used in well stimulation operations, formic acid and other short-chained aliphatic acids and their related aldehydes or precursors typically present in corrosion inhibitors have been recently associated with the corrosion of pipelines and/or other equipment. Therefore, ACIs that are free of such acids or acid precursors are highly desirable for acid stimulation applications.

SUMMARY

A method of treating a subterranean formation penetrated by a wellbore of a well having iron-containing components is carried out by introducing a treatment fluid into the wellbore of the well. The treatment fluid is formed from an aqueous solution, a mineral acid, a viscoelastic surfactant gelling agent and corrosion inhibitor system containing at least one of an alkyl, alkenyl, alicyclic or aromatic substituted aliphatic ketone (also called an aromatic ketone) and aliphatic or aromatic aldehyde. The treatment fluid is substantially free of any formic acid or precursor of formic acid.

In certain embodiments the corrosion inhibitor system comprises a mixture of 1) at least one of an alkenyl phenone and an $\alpha,\beta$-unsaturated aldehyde; and 2) at least one of an unsaturated ketone and unsaturated aldehyde other than said alkenyl phenone and $\alpha,\beta$-unsaturated aldehyde. The corrosion inhibitor system may also include other components such as a dispersing agent, an extender, an intensifier and an alcohol solvent. The corrosion inhibitor system may be present in the treatment fluid in an amount of from about 0.2% to about 3% by weight.

The mineral acid may include hydrochloric acid, which may be present in the treatment fluid in an amount of from about 0.3% or more by weight.

The treatment fluid may further include a corrosion inhibitor intensifier. The corrosion inhibitor intensifier may be composed of at least one of cuprous iodide, cuprous chloride, and mixtures of these. The corrosion inhibitor intensifier may be present in the treatment fluid in an amount of about 0.015 lbs/gal of treatment fluid (0.0018 kg/L) to about 0.15 lbs/gal of treatment fluid (0.018 kg/L).

The treatment fluid may be used for at least one of scale removal, perforation cleaning, matrix acidizing and acid fracturing treatments. The viscoelastic surfactant may be a erucylamidopropyl betaine surfactant. In certain embodiments, the treatment fluid may be substantially free of any short-chain aliphatic acid.

In another method of treating a subterranean formation penetrated by a wellbore of a well having iron-containing components, the subterranean formation is contacted with a treatment fluid. The treatment fluid is formed from an aqueous solution, a mineral acid, a viscoelastic surfactant gelling agent and a corrosion inhibitor system comprised of a mixture of 1) at least one of an alkenyl phenone and an $\alpha,\beta$-unsaturated aldehyde; 2) at least one of an unsaturated ketone and unsaturated aldehyde other than said alkenyl phenone and $\alpha,\beta$-unsaturated aldehyde; 3) a dispersing agent and 4) an alcohol solvent. In the method, the treatment fluid is substantially free of any short-chain aliphatic acid.

The mineral acid may include hydrochloric acid, which may be present in the treatment fluid in an amount of from about 0.3% or more by weight.

The treatment fluid may further include a corrosion inhibitor intensifier. The corrosion inhibitor intensifier may be composed of at least one of cuprous iodide, cuprous chloride, and mixtures of these. The corrosion inhibitor intensifier may be present in the treatment fluid in an amount of about 0.015 lbs/gal of treatment fluid (0.0018 kg/L) to about 0.15 lbs/gal of treatment fluid (0.018 kg/L).

The treatment fluid may be used for at least one of scale removal, perforation cleaning, matrix acidizing and acid fracturing treatments. The viscoelastic surfactant may be a erucylamidopropyl betaine surfactant.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
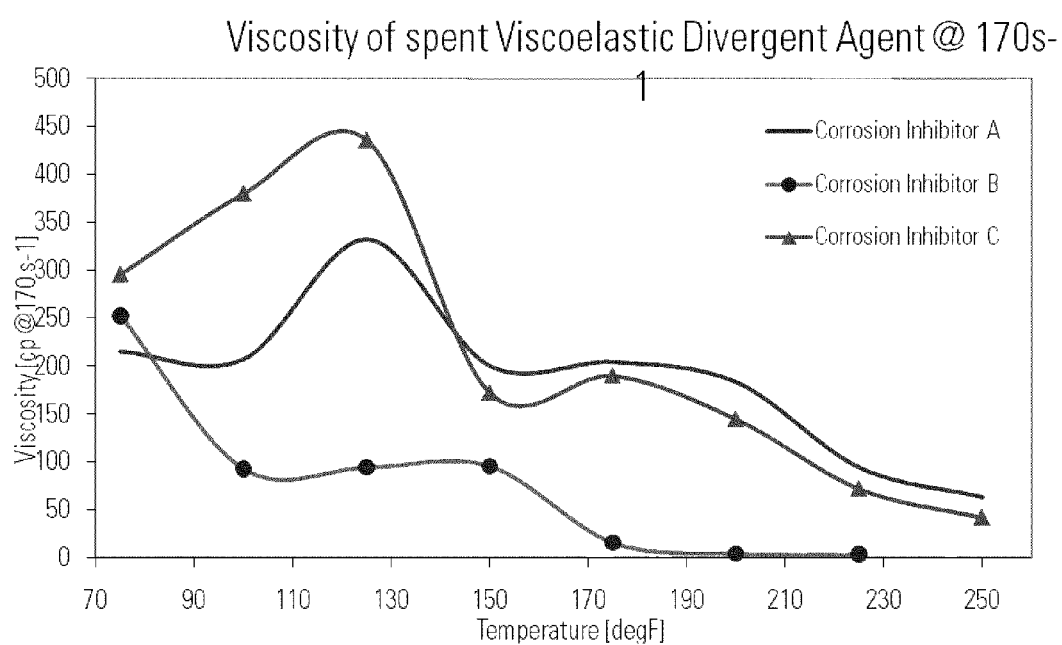
FIG. 1 is a plot of the viscosity versus temperature of spent viscoelastic diverting acid treatment fluids containing different corrosion inhibitors.

The description and examples are presented solely for the purpose of illustrating the different embodiments of the invention and should not be construed as a limitation to the scope and applicability of the invention. While any compositions of the present invention may be described herein as comprising certain materials, it should be understood that the composition could optionally comprise two or more chemically different materials. In addition, the composition can also comprise some components other than the ones already cited. While the invention may be described in terms of treatment of vertical wells, it is equally applicable to wells of any orientation. The invention will be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. When a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

The present invention is directed towards novel methods of acid treating subterranean formations with treatment fluids that contain corrosion inhibitors that are free of formic acid or similar aliphatic acids that may contribute to the corrosion of iron-containing elements of the well, such as tubing, or associated equipment used with the well.

Acid stimulation is a technique widely used to increase production of oil and gas from carbonate reservoirs. The injected acid dissolves the minerals in the formation and creates conductive flow channels known as wormholes that facilitate production. When reservoirs with different zones of permeability are treated with acid, the acid flows into the high permeability zones and may not stimulate the low permeability zones. To stimulate the low permeability zones, it is necessary to divert the acid from high to low permeability zones. Similarly, when long enough intervals are treated with acid, diversion is needed to prevent a heterogeneous injection profile from resulting.

One of the methods used to divert acid involves mixing a viscoelastic surfactant (VES) with the acid prior to injection of the acid into the formation. The viscoelastic surfactant is a surfactant that under certain conditions can impart viscoelasticity to a fluid. The viscosity of certain mixtures of acid and VES depends on the concentration of acid. The viscosity of the mixture is low when the mixture is strongly acidic and the viscosity increases as the acid spends in the formation. This increase in viscosity causes increased resistance to flow in the high permeability zone, leading to a build-up of pressure that helps in diverting the flow of treating fluid to lower permeability zones. In this use, such fluids are called viscoelastic diverting acids, or VDA's. Similarly, in acid fracturing, the growing fracture may encounter or create high-permeability regions through which acid, which is incorporated in the fluid so that it can etch the fracture faces, leaks off into the formation. Avoiding, or at least minimizing, this loss of acid is called leakoff control. At best, this is inefficient and wasteful of acid; at worst, this may reduce or eliminate fracture growth. The same compositions and methods that are used for diversion in matrix treatments may be used for leakoff control in fracturing treatments.

The treating acids used in the present invention for acid treating the subterranean formation are typically mineral acids. These may include hydrochloric acid, nitric acid, phosphoric acid, etc. In certain applications where sandstone formations are being treated, the mineral acid may include hydrofluoric acid or sources of hydrofluoric acid, as well as other acids. Organic acids, which do not constitute "short-chain aliphatic acids" as defined herein, or precursors of such organic acids, which are useful in stimulating formations may also be used. Sources of acids, such as aldehydes or alcohols that may be oxidized or hydrolyzed to acid, may be used. Unless it is apparent from its context the use of the expression "acid" is meant to encompass both the acid and sources of the acid that effectively form the acid to facilitate the treatment. Mixtures of these acids and/or their sources may be used. In certain embodiments only mineral acids are used. For treating carbonate formations, hydrochloric acid is particularly useful. The acid may be present in the treating fluid in an amount of from about 0.3% to about 28% by weight of the acid treatment fluid, more typically the acid is used in an amount of from about 15% to about 28% by weight of the acid treatment fluid. In certain embodiments from about 17% to about 28% by weight of acid may be used.

The treatment fluid is substantially free of any short-chain aliphatic acids or aldehydes. If any such acids are present they are only present as an impurity in insubstantial amounts of less than 0.01% by weight of the treatment fluid. As used herein, the expression "saturated short-chain aliphatic acid" and similar expressions are meant to encompass those aliphatic acids having a carbon chain length of six carbons or less and their related aldehydes or precursors. Examples of such short-chain aliphatic acids include, but are not limited to, formic acid, acetic acid, propionic acid, N- and iso-butyric acid, glycolic acid, glyoxylic acid, malonic acid, etc. In certain embodiments there may be no organic acid or aliphatic acid of any chain length. In certain further embodiments there may be no organic acid or saturated aliphatic acid with chain length to up to three carbons.

The viscoelastic surfactant systems used may be any of those that are commonly used in VDA and other acid treating fluids, including any co-surfactants, salts, solvents, enhancers, etc. that are used with such systems. Non-limiting examples of such viscoelastic surfactant systems for acid treatment are those described in U.S. Pat. Nos. 5,979,557; 6,258,859; 6,399,546; 6,435,277; 6,703,352; 7,060,661; 7,084,095; 7,288,505; 7,237,608; 7,303,018 and 7,341,107, each of which is incorporated herein by reference for all purposes. The VES may be selected from the group consisting of amphoteric, anionic, cationic, zwitterionic, nonionic, and combinations of these. In certain applications, the amphoteric viscoelastic surfactant is used.

Two examples of suitable commercially available viscoelastic surfactants are MIRATAINE® BET-O-30 and MIRATAINE® BET-E-40, available from Rhodia, Inc.

(Cranbury, N.J., U.S.A.). These are both betaine surfactants. The VES surfactant in BET-O-30 is oleylamidopropyl betaine. MIRATAINE® BET-O-30 contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material is the MIRATAINE® BET-E-40, which was used in the experiments described below. One chemical name for this compound is erucylamidopropyl betaine. MIRATAINE® BET-E-40 is also available from Rhodia, Inc. and contains a erucic acid amide group (including a $C_{21}H_{41}$ alkene tail group) and is supplied as about 40% active ingredient, with the remainder substantially water, sodium chloride, and isopropanol. Erucyylamidopropyl betaine is described in U.S. Pat. No. 7,288,505. Such betaines may include its protonated or deprotonated homolog or salt. BET surfactants, and others that are suitable, are described in U.S. Pat. Nos. 6,703,352 and 7,288,505, which are incorporated herein by reference.

The viscoelastic surfactant in the initial fluid may or may not form micelles. If micelles are formed, they are not of the proper size, shape, or concentration to create a viscosifying structure, so the initial fluid has an essentially water-like viscosity or is readily pumped and introduced into the formation. As the fluid flows through the formation, however, the concentration of surfactant in the fluid at some location, for example at or near a wormhole tip, increases, due to interactions between the formation and the fluid and its components. As the localized surfactant concentration increases, micelles are formed, or micelle shape or size or concentration increases, and the fluid viscosity increases due to aggregation of viscoelastic surfactant structures. Not to be limited by theory, but formation of carbon dioxide by the dissolution of formation carbonate may be a factor in the viscosity increase, as well as increase in pH. With reference to the treatment fluids, when it is described that the fluid is "viscous," "viscoelastic" or "gelled," it is meant to refer to those fluids or portions of fluids wherein the viscoelastic surfactant structures have aggregated to provide the diverting feature. Initial fluids or non-gelled fluids generally have viscosities below about 20 mPa·s. In contrast, viscoelastic or gelled fluids generally have viscosities above about 50 mPa·s. Thus, injection of an initial fluid that is not viscous because it contains a viscoelastic surfactant concentration too low to contribute to the initial viscosity of the fluid may nonetheless be used to treat a formation with a viscous fluid. In matrix acid treatments, for example, this initial fluid system forms wormholes and then gels at or near the tip of the wormhole, causing diversion. In acid fracturing, the initial fluid may gel where leakoff is high, and so this fluid system controls leakoff.

When a VES is incorporated into fluids used in embodiments of the invention, the VES can range from about 0.2% to about 15% by weight of total weight of fluid. In certain embodiments the VES may be used in an amount of from about 0.5% to about 15% by weight of total weight of fluid. In further embodiments, the VES may be used in an amount of from about 2% to about 10% by weight of total weight of fluid. The lower limit of VES may be no less than about 0.2, 0.5, 0.7, 0.9, 1, 2, 3, 4, 5, 6, 7, 8, 9, 10, or 14 percent of total weight of fluid, and the upper limited may be no more than about 15 percent of total fluid weight, specifically no greater than about 15, 14, 13, 12, 11, 10, 9, 8, 7, 6, 5, 1, 0.9, 0.7, 0.5 or 0.3 percent of total weight of fluid.

The amount of VES used in the treatment fluids, however, depends upon the properties of the formation, for example the temperature, chemical composition and pore structure, and the fluid composition, for example the nature of the surfactant and the nature and concentration of other components, for example the types salts and acids used and the amounts used. The concentration of viscoelastic surfactant in the initial fluid depends upon the volume of formation to be treated, the volume of initial fluid to be injected, the extent to which the surfactant is concentrated during the treatment, and the concentration needed to viscosify the fluid. It should be understood that an initial concentration of a given viscoelastic surfactant might be insufficient to allow aggregation of that viscoelastic surfactant in that fluid while the same concentration of another surfactant, or of that surfactant in another fluid or under other conditions, might be sufficient for aggregation. Therefore, the appropriate concentration in the present invention is the same as, or even more than, the concentration of the same or a different surfactant reportedly used under other conditions as a viscoelastic surfactant. The underlying concept is that the initial concentration used in the method of the present invention is insufficient, under the initial conditions of use, to form viscosifying aggregates to facilitate introduction into the formation being treated.

A corrosion inhibitor system that is free or substantially free of any short-chain aliphatic acids, such as formic acid, as described previously, is used with the acid treatment fluid. As used herein, the expression "corrosion inhibitor system" is meant to encompass both the active corrosion inhibitor components as well as any non-active components, such as solvents, dispersing agents, etc., which may be in solution or premixed together prior to combining with the treatment fluid. In certain instances, the corrosion inhibitor system may include only active components. The corrosion inhibitor system is typically provided in liquid form and is mixed with the other components of the treatment fluid at the surface and then introduced into the formation. The corrosion inhibitor system is present in the treatment fluid in an amount of from about 0.2% to about 3% by total weight of the treatment fluid. The corrosion inhibitor used with the fluids of the present invention includes an alkyl, alkenyl, alycyclic or aromatic substituted aliphatic ketone, which includes alkenyl phenones, or an aliphatic or aromatic aldehyde, which includes $\alpha,\beta$-unsaturated aldehydes, or a combination of these. Alkyl, alycyclic or aromatic phenone and aromatic aldehyde compounds may also be used in certain applications. Other unsaturated ketones or unsaturated aldehydes may also be used. Alkynol phenone, aromatic and acetylenic alcohols and quaternary ammonia compounds, and mixtures of these may be used, as well. All of these may be dispersed in a suitable solvent, such as an alcohol, and may further include a dispersing agent and other additives.

The alkyl, alkenyl, alycyclic or aromatic substituted aliphatic ketones may include those described in U.S. Pat. No. 3,077,454, which is incorporated herein by reference. Of these compounds alkenyl phenones may be particularly well suited. Unless otherwise apparent from its context, as used herein "ketones", "phenones" and aldehydes, and similar expressions is meant to include both the ketone and phenone compounds as well as their precursors that may form the ketone or phenone in situ. Non-limiting examples of alkenyl phenone compounds are described in U.S. Pat. Nos. 5,013,483 and 5,096,618, which are each incorporated herein by reference. Unless otherwise apparent from its context, as used herein "alkenyl phenone" is meant to include alkenyl phenone and precursors of alkenyl phenone that may form alkenyl phenone in situ. The alkenyl phenone may have the general Formula (1):

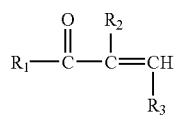

wherein $R_1$ may be unsubstituted or inertly substituted aryl of 6 to about 10 carbons, $R_2$ and $R_3$ may be the same or different and each be a hydrogen, halogen, or an unsubstituted or inertly substituted aliphatic of about 3 to about 12 carbons. $R_2$ may also be an alkanol, an ether, or an unsubstituted or inertly substituted aryl of 6 to about 10 carbon atoms. The total number of carbon atoms in the compound of Formula 1 may not exceed 16 in certain embodiments.

The aliphatic or aromatic aldehydes may include those described in U.S. Pat. No. 3,077,454. Of these compounds α,β-unsaturated aldehydes may be particularly well suited. Non-limiting examples of such α,β-unsaturated aldehyde compounds are described in U.S. Pat. No. 4,734,259, which is incorporated herein by reference. In particular, the α,β-unsaturated aldehyde cinnamaldehyde or its derivative has been found to be particularly useful, particularly the trans isomer of cinnamaldehyde. Unless otherwise apparent from its context, as used herein "aldehyde" and similar expressions is meant to include both the aldehyde compounds as well as their precursors that may form the aldehyde in situ. The α,β-unsaturated aldehyde may have the general Formula (2):

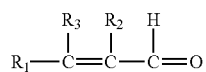

wherein, $R_1$ represents a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, e.g., phenyl, benzyl or the like, a substituted aryl group containing one or more non-interfering substituents, or a non-interfering substituent; $R_2$ represents hydrogen, a saturated or unsaturated aliphatic hydrocarbon group containing from 1 to about 5 carbon atoms, a substituted saturated aliphatic hydrocarbon group containing from 1 to about 5 carbon atoms and also containing one or more noninterfering substituents, an aryl group, a substituted aryl group containing one or more non-interfering substituents, or a non-interfering substituent; and $R_3$ represents hydrogen, a saturated or unsaturated aliphatic hydrocarbon group containing from about 3 to about 12 carbon atoms, a substituted saturated or unsaturated aliphatic hydrocarbon group containing from about 3 to about 12 carbon atoms and also containing one or more non-interfering substituents, an aryl group, a substituted aryl group containing one or more non-interfering substituents, or a non-interfering substituent; with the total number of carbon atoms in substituents represented by $R_1$, $R_2$ and $R_3$ ranging from 1 to about 16, and more particularly from about 5 to about 10.

Non-interfering substituents referred to above which replace hydrogen on the α and β carbon atoms of the aldehydes of Formula 2 above or which are found in hydrocarbon substituents which replace hydrogen on these carbon atoms have no adverse effect on the corrosion inhibition. They include, for example, lower alkyl (containing from 1 to about 4 carbon atoms), lower alkoxy (containing from 1 to about 4 carbon atoms), halo, i.e., fluoro, chloro, bromo or iodo, hydroxyl, dialkylamino, cyano, thiocyano, N,N-dialkylcarbamoylthio and nitro substituents.

The alkyl, alkenyl, alycyclic or aromatic substituted aliphatic ketones and/or a aliphatic or aromatic aldehydes or mixtures of these may be used in an amount of from about 0.1% to about 3% by total weight of the treatment fluid. High concentrations of the corrosion inhibitor may affect the VES rheology. If this is the case, lower quantities may be used.

The corrosion inhibitor may also include an unsaturated ketone or unsaturated aldehyde other than those alkyl, alkenyl, alycyclic or aromatic substituted aliphatic ketones and/or a aliphatic or aromatic aldehydes previously described. Such unsaturated ketones or unsaturated aldehydes may be other than those alkenyl phenones and α,β-unsaturated aldehydes previously described. The unsaturated ketone may be present in an amount of from about 0.01% to 1% by total weight of the treatment fluid. The unsaturated ketones and aldehydes may be those having at least one alkene substituent having a chain length of from 2 to 6 carbon atoms bonded to the carbonyl carbon atom and at least one carbon-carbon double bond. The substituents may be aliphatic or aryl substituents.

The acetylenic alcohols employed in the present invention may suitably include those described in European Patent No. 0638663B1, which is herein incorporated by reference. Examples of such alcohols include methyl butanol, methyl pentynol, hexynol, ethyl octynol, propargyl alcohol, benzyl butanol, naphthyl butanol, and the like. Acetylenic alcohols having 3 to 10 carbon atoms may be particularly useful.

The quaternary ammonium compounds employed may comprise aromatic nitrogen compounds such as those described in European Patent No. 0638663B1. These may include alkyl pyridine-N-methyl chloride quaternary, alkyl pyridine-N-benzyl chloride quaternary, quinoline-N-methyl chloride quaternary, quinoline-N-benzyl chloride quaternary, quino-line-N-(chloro-benzyl chloride) quaternary, isoquinoline quaternaries, benzoquinoline quaternaries, chloromethyl naphthalene quaternaries and admixtures of such compounds, and the like. The quaternary compounds may also be coupled with a metal compound such as described in U.S. Pat. Nos. 5,002,673; 5,089,153; 5,130,034; 5,200,096; and 5,209,859, the disclosures of which are incorporated herein by reference.

The active corrosion inhibitor components may be dispersed in a solvent. The solvent useable in the formulation may be a non-aqueous organic liquid selected from polar aprotic solvents, aromatic solvents, terpinols, and alcohols. Examples of suitable solvents include polar aprotic dimethyl formamide (DMF), dimethylsulfoxide (DMSO), dimethylacetamide (DMA), 1-methyl-2-pyrrolidone ("pyrrolidone"), tetramethylene sulfone ("sulfolane"), and mixtures thereof. The aprotic solvent (e.g. DMF, DMSO, DMA, pyrrolidone, and sulfolane) may be blended with alcohol and/or aromatic solvents. The aromatic solvents include heavy aromatic naptha, xylene, toluene, and others as described in U.S. Pat. No. 4,498,997, which is incorporated herein by reference. Examples of suitable alcohol solvents include ethanol, propanol, isopropanol, n-butanol, isobutanol, ethylene glycol, diethylene glycol, monobutyl ether of ethylene glycol, glycerine and the like. Propargyl alcohol may also be used. The alcohol solvent may make up from about 0.1% to about 99.99% by total weight of the corrosion inhibitor system.

A dispersing agent may also be incorporated with the corrosion inhibitor system and used with the VDA. The dispersing agent may be an organic amine (including aromatic amines, aliphatic amines, and heterocyclic amines) dispersant. Nonlimiting examples of dispersants are aminophenol, aniline, chloroaniline, toluidine, diphenyl amine, pico-line, alkyl pyridine, or n-octylamine.

The corrosion inhibitor system may also include a surfactant. The surfactant serves to wet the tubular goods to permit filming of the corrosion inhibitor components. Suitable surfactants are the nonionics having hydrophilic lipophilic balance (HLB) numbers of 1 to 18, more particularly 3 to 16, such as laureates, stearates, and oleates. Nonionic surfactants include the polyoxyethylene surfactants, (such as ethoxylated alkyl phenols, ethoxylated aliphatic alcohols), poly-ethylene glycol esters of fatty, resin, and tall oil acids. Examples of such surfactants are poly-oxyethylene alkyl phenol wherein the alkyl group is linear or branched $C_8$-$C_{12}$ and contains above about 60% by weight poly oxyethylene. Octyl and nonyl phenols containing 9 to 15 moles ethylene oxide per mole hydrophobe may be used as the ethoxylated alkyl phenol surfactants. The polyoxyethylene ester of fatty acids may also be used and include the mono and dioleates and sesquioleates, wherein the average molecular weight of the esterified polyethylene glycol is between about 200 and 1,000.

Other surfactants which are also useful include cationic amines, quaternary amines, amphoterics, anionic sulfates, anionic sulfonates, and alkoxylated alkylphenol resins. Polyoxyethylene sorbitan oleates are also useable. In practice, the nonionics may be blended to provide the desired properties. A particularly useful surfactant is a blend of polyethylene glycol esters of fatty acids and ethoxylated alkylphenols.

A corrosion inhibitor intensifier or enhancer may also be used in combination with the corrosion inhibitor system. These may include various halide salts. Metal halide salts are particularly useful. Non-limiting examples include antimony trichloride, copper chloride, cuprous iodide, potassium iodide, and mixtures of these. In certain applications, a corrosion inhibitor intensifier containing a mixture of copper chloride and cuprous iodide has been found particularly useful. In such mixtures the copper chloride may make up from about 1% to about 99% by weight of the mixture and the cuprous iodide may make up from about 1% to about 99% by weight of the mixture. The corrosion inhibitor intensifier may be used in an amount of from about 0.015 lbs/gal of treatment fluid (0.0018 kg/L) to about 0.15 lbs/gal of treatment fluid (0.018 kg/L). The corrosion inhibitor intensifier may be premixed with the corrosion inhibitor system or may be added separately to the treatment fluid.

An extender may also be used with the corrosion inhibitor. A suitable extender is iodine, as described in European Patent No. EP0638663B1.

In use, the acid treatment fluid, which may be a matrix acidizing fluid or an acid fracturing fluid, may be formulated at the surface. The viscoelastic surfactant, mineral acid, corrosion inhibitor system and any corrosion inhibitor intensifier and other additives may be mixed with an aqueous fluid, such as fresh water, sea water, brine (e.g. 1-2 wt. % KCl), etc. The treatment fluid is then introduced into the wellbore of the formation to facilitate treatment. Matrix acidizing and acid fracturing using the treatment fluids are typically undertaken to provide improved flow paths for the production of hydrocarbons, but the method is equally useful in wells for the production of other fluids (such as water or helium) or for injection wells (for example for enhanced oil recovery or for disposal). The VDA fluids containing the corrosion inhibitor may also be used in scale removal and perforation cleaning, as well as other applications.

The following examples further serve to illustrate the invention. Unless otherwise indicated or apparent from its context, all percentage concentrations presented in the examples are based on weight percent.

EXAMPLES

Example 1

Rheology tests were performed on 100% spent hydrochloric acid VDA solutions using three different corrosion inhibitors (Corrosion Inhibitors A-C), which were each comprised of a mixture of alkenyl phenones or $\alpha,\beta$-unsaturated aldehydes, unsaturated ketones, a dispersing agent and an alcohol solvent. Each of the VDA solutions contained an erucylamidopropyl betaine viscoelastic surfactant, available as BET-E-40 from Rhodia, Inc., in an amount of 7.5% by total weight of the solution and initially contained HCl in an amount of 18% by total weight of the solution. Corrosion Inhibitor A was comprised of a mixture of about 25% isopropanol, about 35% cinnamaldehyde, about 15% benzyl quinolinium chloride, and about 15% of a mixture of ethoxylated $C_{11}$ linear and branched alcohols. Corrosion Inhibitor B was comprised of about 10% of a mixture of methanol and isopropanol, about 8% water, about 25% naphthyl methyl quinolinium chloride, about 10% ethoxylated tridecyl alcohol, about 8% 3-methoxy-2-benzoyl-1-propene, and about 1% to about 3% each of a number of other amines, acids, alcohols, ketones and ethers. Corrosion Inhibitor C was a mixture of about 35% methanol, about 5% propargyl alcohol, and about 60% of a proprietary organic mixture. Each of the Corrosion Inhibitors A-C was used in an amount of approximately 0.8% by total weight of the solution.

The rheology tests were carried out using a Grace (R1, B1) rheometer at $170 \text{ s}^{-1}$ to measure the viscosities of the spent acid solutions at different temperatures. The results are presented in FIG. 1. The fluids containing Corrosion Inhibitors A and B exhibited higher shear properties, with viscosities of at least 50 mPa·s at 250° F. (121.1° C.).

Example 2

Corrosion tests were conducted for each of acid fluids containing each of the Corrosion Inhibitors A-C of Example 1. Aqueous hydrochloric acid solutions at 18 wt % HCl were used in the corrosion tests and comprised 7.5% by total weight of erucylamidopropyl betaine viscoelastic surfactant and about 0.8% by total weight of each of the Corrosion Inhibitors A-C. The corrosion tests were conducted at 225° F. (107.2° C.) using L80 (carbon steel) and SM2535 (chromium-nickel steel alloy) metal coupons of 1 inch (2.54 cm) by 1.75 inch (4.44 cm) and had a total surface area of approximately 25 $cm^2$.

Each of the metal coupons was also visually inspected to provide a pitting index. A pitting index of 0 equated to no pitting. A pitting index of 1 equated to minor edge corrosion. A pitting index of 2 equated to pitting on the edge only. A pitting index of 3 equated to less than 25 (<25) pin points on the surface, with a pitting index of 4 equating to greater than 25 (>25) pin points on the surface. The results are presented in Table 1 below.

TABLE 1

| Corrosion Inhibitor Sample | Test Coupon Metal | Pitting Index | Corrosion Rates lb/ft² (kg/m²) Avg. |
|---|---|---|---|
| | | Corrosion Results | |
| A | SM2535 | 0 | 0.0056 (0.028) |
| B | SM2535 | 0 | 0.0060 (0.030) |
| C | SM2535 | 0 | 0.0055 (0.028) |
| A | L80 | 2 | 0.2995 (1.498) |
| B | L80 | 2 | 0.2973 (1.486) |
| C | L80 | 2 | 0.3258 (1.629) |

Example 3

Additional corrosion tests were conducted using corrosion inhibitor intensifiers. Aqueous hydrochloric acid solutions at 18 wt % HCl were used in the corrosion tests and comprised 7.5% by total weight of erucylamidopropyl betaine viscoelastic surfactant and about 0.8% by total weight of each of the corrosion inhibitors A and B. The corrosion tests were conducted at 225° F. (107.2° C.) using L80 (carbon steel) and SM2535 (chromium-nickel steel alloy) metal coupons. The amount of intensifier was based upon total weight of fluid. The results are presented in Table 2 below.

TABLE 2

| Corrosion Inhibitor | Corrosion Inhibitor Intensifier | Intensifier Conc. | Test Coupon Metal | Pitting Index | Corrosion Rates lb/ft² (kg/m²) Avg. |
|---|---|---|---|---|---|
| | | | | Corrosion Results | |
| A | None | N/A | L80 | 4 | 0.2599 (1.300) |
| A | Potassium Iodide | 0.25 lb/gal (0.066 kg/L) | L80 | 2 | 0.0807 (0.404) |
| A | Copper Chloride | 0.4 lb/gal (0.105 kg/L) | L80 | 4 | 0.1141 (0.570) |
| A | Potassium Iodide | 0.25 lb/gal (0.066 kg/L) | SM2535 | 0 | 0.0014 (0.007) |
| A | Copper Chloride | 0.4 lb/gal (0.105 kg/L) | SM2535 | 0 | 0.0031 (0.015) |
| B | None | N/A | L80 | 2 | 0.1438 (0.719) |
| B | Potassium Iodide | 0.25 lb/gal (0.066 kg/L) | L80 | 2 | 0.0653 (0.326) |
| B | Copper Chloride | 0.4 lb/gal (0.105 kg/L) | L80 | 2 | 0.0653 (0.326) |
| B | Potassium Iodide | 0.25 lb/gal (0.066 kg/L) | SM2535 | 0 | 0.0016 (0.008) |
| B | Copper Chloride | 0.4 lb/gal (0.105 kg/L) | SM2535 | 0 | 0.0030 (0.015) |

Example 4

Additional corrosion tests were conducted using Corrosion Inhibitor A and different corrosion intensifiers. Aqueous hydrochloric acid solutions at 18 wt % HCl were used in the corrosion tests and comprised 7.5% by total weight of erucylamidopropyl betaine viscoelastic surfactant and about 0.8% by total weight of each of the Corrosion Inhibitor A. The corrosion tests were conducted at 225° F. (107.2° C.) using L80 (carbon steel) metal coupons. The amount of intensifier was based upon total weight of fluid. The results are presented in Table 3 below. As can be seen, the Test 7 that utilized a 50:50 mixture of cuprous iodide (CuI) and cuprous chloride (CuCl) showed significantly higher acid corrosion resistance.

TABLE 3

| Test | Corrosion Inhibitor Intensifier | Intensifier Conc. | Pitting Index | Corrosion Rates lb/ft² (kg/m²) Data | Avg. |
|---|---|---|---|---|---|
| | | | Corrosion Results L80 Metal Coupon | | |
| 1 | Copper Chloride | 0.25 lb/gal (0.066 kg/L) | 2 | 0.0875 (0.438) | 0.1015 (0.508) |
| 2 | Copper Chloride | 0.25 lb/gal (0.066 kg/L) | 2 | 0.1155 (0.575) | |
| 3 | Potassium Iodide | 0.5 lb/gal (0.132 kg/L) | 2 | 0.0511 (0.256) | 0.0504 (0.252) |
| 4 | Potassium Iodide | 0.5 lb/gal (0.132 kg/L) | 5 | 0.0498 (0.249) | |
| 5 | Antimony Trichloride | 6 mmole | 5 | 0.5351 (2.676) | 0.5183 (2.592) |
| 6 | Antimony Trichloride | 6 mmole | 1 | 0.5016 (2.508) | |
| 7 | CuI/CuCl | 0.25 lb/gal (0.066 kg/L) | 1 | 0.0134 (0.670) | 0.0139 (0.070) |
| 8 | CuI/CuCl | 0.25 lb/gal (0.066 kg/L) | | 0.0144 (0.720) | |

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of scale removing or perforation cleaning applied to a subterranean formation penetrated by a wellbore of a well having iron-containing components, the method comprising:
   introducing a treatment fluid into the wellbore of the well, the treatment fluid comprising an aqueous solution, a mineral acid, a viscoelastic surfactant gelling agent and corrosion inhibitor system selected from the group consisting of an alkyl substituted aliphatic ketone, alkenyl substituted aliphatic ketone, alicyclic substituted aliphatic ketone, aromatic substituted aliphatic ketone, aliphatic aldehyde and aromatic aldehyde, the treatment fluid being substantially free of any formic acid or precursor of formic acid;
   contacting the treatment fluid with the iron-containing components; and
   removing scale or cleaning perforation with the treatment fluid.

2. The method of claim 1, wherein:
   the treatment fluid further comprises a corrosion inhibitor intensifier.

3. The method of claim 2, wherein:
   the corrosion inhibitor intensifier is comprised of at least one of cuprous iodide, cuprous chloride, or mixtures of these.

4. The method of claim 2, wherein:
the corrosion inhibitor intensifier is present in the treatment fluid in an amount of about 0.015 lbs/gal of treatment fluid to about 0.15 lbs/gal of treatment fluid.

5. The method of claim 1, wherein:
the corrosion inhibitor system comprises a mixture of 1) at least one of an alkenyl phenone or an α, β-unsaturated aldehyde; and 2) at least one of an unsaturated ketone or unsaturated aldehyde other than said alkenyl phenone and α, β-unsaturated aldehyde.

6. The method of claim 1, wherein:
the corrosion inhibitor system comprises a mixture of 1) at least one of an alkenyl phenone or an α, β-unsaturated aldehyde; 2) at least one of an unsaturated ketone or unsaturated aldehyde other than said alkenyl phenone and α, β-unsaturated aldehyde; 3) a dispersing agent; 4) an extender; 5) an intensifier and 6) a solvent.

7. The method of claim 1, wherein:
the mineral acid comprises hydrochloric acid.

8. The method of claim 1, wherein:
the mineral acid is present in the treatment fluid in an amount of from about 0.3% or more by weight.

9. The method of claim 1, wherein:
the corrosion inhibitor system is present in the treatment fluid in an amount of from about 0.2% to about 3% by weight.

10. The method of claim 1, wherein:
the viscoelastic surfactant is a erucylamidopropyl betaine surfactant.

11. The method of claim 1, wherein:
the treatment fluid is substantially free of any short-chain aliphatic acid.

12. A method of scale removing or perforation cleaning applied to a subterranean formation penetrated by a wellbore of a well having iron-containing components, the method comprising:
contacting the subterranean formation with a treatment fluid, the treatment fluid comprising an aqueous solution, a mineral acid, a viscoelastic surfactant gelling agent and a corrosion inhibitor system comprised of a mixture of 1) at least one of an alkenyl phenone or an α, β-unsaturated aldehyde; 2) at least one of an unsaturated ketone or unsaturated aldehyde other than said alkenyl phenone and α, β-unsaturated aldehyde; 3) a dispersing agent and 4) an alcohol solvent, the treatment fluid being substantially free of any short-chain aliphatic acid;
contacting the treatment fluid with the iron-containing components; and
removing scale or cleaning perforation with the treatment fluid.

13. The method of claim 12, wherein:
the treatment fluid further comprises a corrosion inhibitor intensifier.

14. The method of claim 13, wherein:
the corrosion inhibitor intensifier is comprised of at least one of cuprous iodide or cuprous chloride.

15. The method of claim 13, wherein:
the corrosion inhibitor intensifier is present in the treatment fluid in an amount of about 0.015 lbs/gal of treatment fluid to about 0.15 lbs/gal of treatment fluid.

16. The method of claim 12, wherein:
the mineral acid comprises hydrochloric acid.

17. The method of claim 12, wherein:
the mineral acid is present in the treatment fluid in an amount of from about 0.3% about 28% by weight.

18. The method of claim 12, wherein:
the corrosion inhibitor system is present in the treatment fluid in an amount of from about 0.2% to about 3% by weight.

19. The method of claim 11, wherein:
the viscoelastic surfactant is a erucylamidopropyl betaine surfactant.

* * * * *